Figure 1:
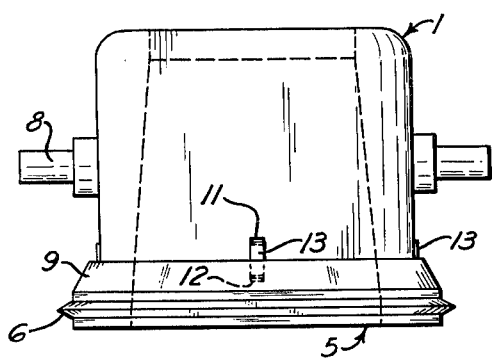

March 8, 1966 R. E. DALEY 3,239,187
HOT TOP FOR INGOT MOLD
Filed July 28, 1964

INVENTOR.
ROBERT E. DALEY
BY
Brown, Critchlow, Flick & Peckham
ATTORNEYS.

United States Patent Office 3,239,187
Patented Mar. 8, 1966

3,239,187
HOT TOP FOR INGOT MOLD
Robert E. Daley, 997 Balmoral Drive,
Pittsburgh 37, Pa.
Filed July 28, 1964, Ser. No. 385,716
6 Claims. (Cl. 249—202)

This invention relates to ingot mold hot tops, and more particularly to those having refractory bottom rings engaging the inside of molds.

In my Patent 2,835,943 a hot top is shown which is provided with a refractory bottom ring surrounded by an outwardly tapered portion that projects slightly beyond the bottom of the metal casing in order to engage the inner surface of the ingot mold as the hot top is lowered a few inches into the mold. A tight joint between the bottom ring and the mold is formed under normal circumstances, which prevents the hot metal from rising between the mold and hot top. Sometimes, however, a good seal is not formed in this manner because the bottom ring has been damaged. In that case the hot metal can rise up around the hot top casing in the narrow space between it and the mold. This metal forms a shroud around the lower part of the casing, which makes it very difficult to remove the hot top from the mold and from the ingot. Moreover, due to the narrow space between the hot top and mold, the operator generally cannot see the metal rising between them until it is too late. Heretofore, the hot top casing could not be made smaller in order to increase the width of the space around its lower portion, because that would reduce the size of the inside of the hot top, with the result that there would be an insufficient body of metal inside the hot top to remain molten and feed the body of the ingot below it as the latter shrank on cooling. If the inside of the hot top was not reduced in size, the thickness of the lining had to be reduced and that permitted the sink head to cool prematurely.

It is among the objects of this invention to provide a hot top, which is spaced far enough inwardly from the surrounding ingot mold to provide a wide space between them, which does not reduce the horizontal cross sectional area of the inside of the hot top appreciably, which has a refractory bottom ring that protects the outside of the lower portion of the metal casing from hot metal, and in which the bottom ring supports the hot top lining.

In accordance with this invention the metal casing of a hot top has an inner surface that diverges downwardly to the bottom of the casing. The non-metallic lining for the casing is quite thin compared with conventional hot top linings and includes exothermic material. There is a refractory bottom ring beneath the casing, which supports the lining and projects laterally outward from the casing and up around its lower end. Means are provided for connecting the ring and casing together. The ring projects far enough from the metal casing to provide a wide space above it between the casing and surrounding mold. Preferably, the upper surface of the laterally projecting portion of the bottom ring slopes downwardly and outwardly. For best results, the lining of the hot top is made in three layers integrally joined together. The inner or exposed layer of the lining is an exothermic material which burns and helps maintain the metal in the hot top in a molten condition even though the lining is thin. One of the other layers is formed from a dense refractory, but the remaining layer is a relatively porous insulating layer.

Figure 2:
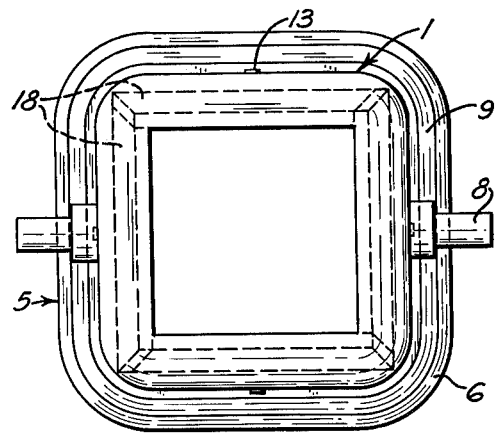
Figure 3:
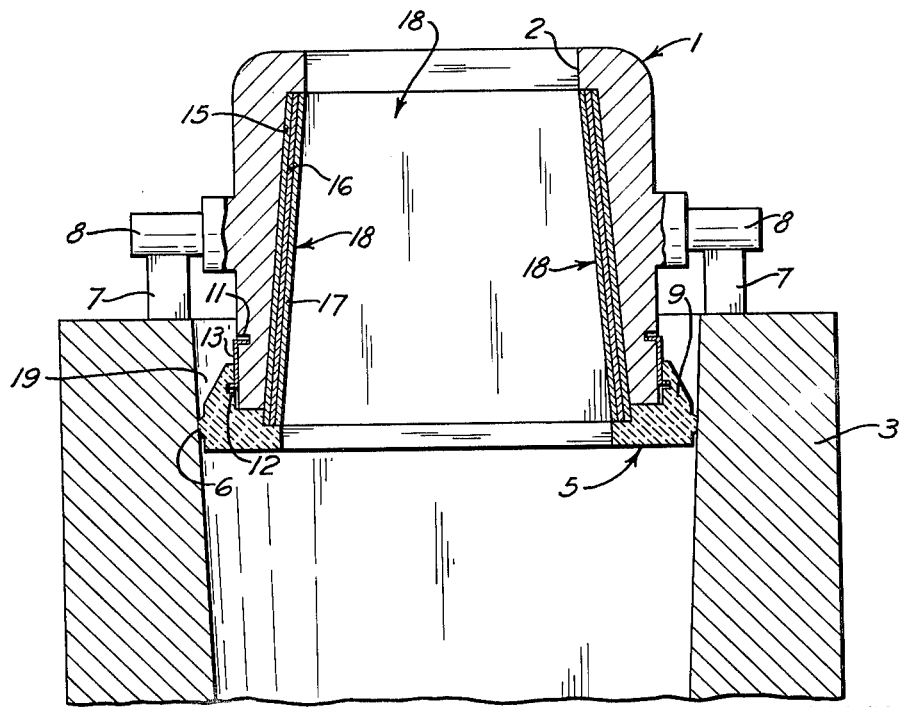

The preferred embodiment of the invention is illustrated in the accompanying drawing, in which:

FIG. 1 is a side view of my hot top;
FIG. 2 is a plan view of the hot top; and
FIG. 3 is an enlarged vertical section, showing the hot top inserted in an ingot mold.

Referring to the drawings, the hot top's metal casing 1 has an inner surface that diverges downwardly to the bottom of the casing. There is no inturned ledge at the bottom, although an inwardly projecting lip 2 may be provided at the top. This metal casing is considerably smaller than conventional hot tops relative to the molds with which it is intended to be used, so that when the lower portion of the casing is lowered into a mold and centered therein there will be a space between it and the mold 3 wide enough to permit a person to see down between them without any difficulty. Preferably, this space should be at least one inch wide.

To protect the lower end of the casing and seal the space between it and the mold, a refractory bottom ring 5 is provided, on which the casing rests. This ring projects laterally outward from the casing far enough to tightly engage the inner surface of the mold at the desired level therein. For best results it is suggested that the outside of the ring be provided with a tapered rib 6 like that shown in FIG. 7 of my above-mentioned patent. This rib will be partly or completely cut or shaved off by the mold as the hot top is lowered into the mold, whereby the bottom ring will tightly engage the inside of the mold. The distance that the hot top is lowered into the mold can be limited by blocks 7 resting on top of the mold and supporting the usual lifting lugs 8 projecting from opposite sides of the hot top.

The portion of the refractory bottom ring that projects outwardly from the metal casing also extends upwardly an inch or more around the lower end of the casing like a wall 9. This wall therefore defines a recess, in which the metal casing is seated and by which the ring is centered on the casing. A suitable way to connect the ring and casing together is to provide the outside of the casing above the ring with holes 11 and to provide the inside of wall 9 with corresponding holes 12. Metal strips or wires 13, having ends bent in opposite directions, are inserted in these holes.

Another feature of this invention is that the horizontal cross sectional area of the body of molten metal inside the hot top will not be reduced materially from the optimum in spite of the reduction in size of the hot top, because a much thinner lining for the casing can be used than heretofore. A thinner lining is possible because it is made in a special way. Thus, adjoining the surrounding casing the lining has a layer 15, shown as the outer layer, made of a dense sand base refractory. The composition of this layer and that of the bottom ring may be the same. Next to this layer there is a considerably less dense insulating layer 16, which may be formed from particles of coke bound together by a suitable binder such as sodium silicate. The inner exposed layer 17 is made of an exothermic material, of which several are known, such as aluminum base material. The three layers of the lining are intimately joined together and preferably formed into panels or boards 18 that can be slipped into the metal casing from the bottom. The lining is supported by an inwardly projecting portion of bottom ring 5. Preferably, the ring projects out beyond the metal casing about as far as it extends inwardly from the outer surface of the casing. Even though this lining is quite thin, it insulates the molten metal inside the hot top casing well enough to prevent that metal from chilling prematurely, because the exothermic layer 17 of the lining produces a considerable amount of heat that offsets any loss in insulating properties that the thin lining might have as compared with the conventional thick lining. Under some conditions, it may be desirable to reverse layers 15 and 16 and put layer 15 in the middle.

After the hot top has been put in place in an ingot mold, molten metal is poured through the hot top to fill the mold and the hot top. In case there is any leakage of molten metal up between the refractory bottom ring and the surrounding mold, it can readily be seen in the wide space between the hot top and mold and the pouring can be shut off before any damage is done. Preferably, the upper surface of the projecting portion or wall of the bottom rings slopes downwardly and outwardly to form a V-shape well 19 between wall 9 and the mold. Any molten metal escaping up between the ring and mold will have to fill this well before it can reach the metal casing of the hot top. An alert operator will see the metal rising in the well before it is too late and will be able to shut off the pour. This will prevent a metal shroud from solidifying against the outside of the hot top casing and interfering with its separation from the mold and ingot.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A hot top for partial insertion in the top of an ingot mold, comprising a metal casing open at top and bottom, a non-metallic lining for the casing including exothermic material, a refractory bottom ring beneath the casing and projecting laterally outward from the casing and up around its lower end to form a wall protecting the outer surface of the lower end of the casing, and means connecting the ring and casing together.

2. A hot top according to claim 1, in which the wall of the bottom ring has an exposed surface that slopes downwardly and outwardly.

3. A hot top refractory bottom ring adapted to be inserted in an ingot mold, the ring being provided with an upstanding outer wall defining a recess for receiving the lower end portions of a hot top casing and lining, the upper surface of said wall sloping downwardly and outwardly to the periphery of the ring.

4. A hot top refractory bottom ring according to claim 3, in which the width of the portion of the ring surrounding said recess is substantially the same as the width of the recess.

5. The combination with an ingot mold, of a hot top partially inserted in the upper end of the mold and comprising a metal casing open at top and bottom and having an inner surface diverging downwardly to the bottom of the casing, the lower portion of the casing being disposed in the mold and spaced inwardly therefrom to form an observation space between them, a refractory bottom ring beneath the casing projecting laterally outward therefrom across said space into engagement with the mold, the portion of the ring surrounding the casing extending up between it and the mold and having a downwardly and outwardly sloping upper surface, means connecting the casing and ring together, and a lining in the casing provided with an exposed exothermic layer, a dense refractory layer, and an insulating layer materially less dense than said dense layer, the lining being in the form of boards, and said bottom ring projecting inward under said boards and supporting them.

6. A hot top refractory bottom ring adapted to be inserted in an ingot mold, the ring being provided with an upstanding outer wall defining a recess for receiving the lower end portions of a hot top casing and lining, the lower portion of the ring projecting outward from said recess farther than said wall, whereby to form a well between said wall and a surrounding ingot mold when said lower portion of the ring engages the inner surface of such a mold.

References Cited by the Examiner

UNITED STATES PATENTS 2,835,943  5/1958  Daley _____ 249—201

FOREIGN PATENTS 785,984  11/1957  Great Britain.
844,189  8/1960  Great Britain.
934,444  1/1948  France.
1,315,675  12/1962  France.

MARCUS U. LYONS, *Primary Examiner.*